(12) United States Patent
Moody, II et al.

(10) Patent No.: US 7,752,384 B2
(45) Date of Patent: Jul. 6, 2010

(54) SYSTEM AND METHOD FOR CONTROLLING ACCESS TO MEDIA LIBRARIES

(75) Inventors: William H. Moody, II, Austin, TX (US); Robert Sims, Round Rock, TX (US)

(73) Assignee: Crossroads Systems, Inc., Austin, TX (US)

(*) Notice: Subject to any disclaimer, the term of this patent is extended or adjusted under 35 U.S.C. 154(b) by 1811 days.

(21) Appl. No.: 10/703,965

(22) Filed: Nov. 7, 2003

(65) Prior Publication Data

US 2004/0133915 A1 Jul. 8, 2004

Related U.S. Application Data

(60) Provisional application No. 60/425,034, filed on Nov. 8, 2002.

(51) Int. Cl.
G06F 12/00 (2006.01)
(52) U.S. Cl. ...................... 711/111; 369/34.01; 711/202
(58) Field of Classification Search ........................ None
See application file for complete search history.

(56) References Cited

U.S. PATENT DOCUMENTS

| | | | |
|---|---|---|---|
| 4,104,718 A | 8/1978 | Poublan et al. | |
| 4,430,701 A | 2/1984 | Christian et al. | |
| 4,945,428 A | 7/1990 | Waldo | |
| 5,214,768 A | 5/1993 | Martin et al. | |
| 5,455,926 A | 10/1995 | Keele et al. | |
| 5,506,986 A | 4/1996 | Healy | |
| 5,546,315 A | 8/1996 | Kleinschnitz | |
| 5,546,557 A | 8/1996 | Allen et al. | |
| 5,548,521 A | 8/1996 | Krayer et al. | |
| 5,568,629 A | 10/1996 | Gentry et al. | |
| 5,592,638 A | 1/1997 | Onodera | |
| 5,598,385 A | 1/1997 | Mizukami et al. | |
| 5,612,934 A | 3/1997 | Dang et al. | |
| 5,740,061 A * | 4/1998 | Dewey et al. ............... 700/214 |
| 5,761,503 A | 6/1998 | Fisher | |
| 5,764,615 A | 6/1998 | Ware et al. | |

(Continued)

FOREIGN PATENT DOCUMENTS

EP    1 156 408 A1    11/2001

(Continued)

OTHER PUBLICATIONS

International Search Report for PCT/US 03/35824, Dec. 6, 2004.

(Continued)

*Primary Examiner*—Gary J Portka
(74) *Attorney, Agent, or Firm*—Sprinkle IP Law Group (57) ABSTRACT

Embodiments of the present invention provide a media library controller that can communicate with multiple physical libraries that are physically separate from each other. The media library controller can maintain a virtualized aggregate media library representing the physical media libraries with which it is in communication. From the physical media libraries, the media library controller can establish a virtual media library and associate a host with the virtual media library. The virtual media library can represent the portions of a physical media library to which the host is allowed access.

24 Claims, 5 Drawing Sheets

U.S. PATENT DOCUMENTS

| | | | |
|---|---|---|---|
| 5,790,852 | A | 8/1998 | Salm |
| 5,870,732 | A | 2/1999 | Fisher et al. |
| 5,892,633 | A | 4/1999 | Ayres et al. |
| 5,914,919 | A | 6/1999 | Fosler et al. |
| 5,925,119 | A * | 7/1999 | Maroney .................. 710/315 |
| 5,956,301 | A | 9/1999 | Dimitri et al. |
| 5,959,866 | A | 9/1999 | Hanaoka et al. |
| 5,963,971 | A | 10/1999 | Fosler et al. |
| 5,971,281 | A | 10/1999 | Frary et al. |
| 6,031,798 | A | 2/2000 | James et al. |
| 6,041,329 | A | 3/2000 | Kishi |
| 6,041,381 | A | 3/2000 | Hoese |
| 6,044,442 | A | 3/2000 | Jesionowski |
| 6,052,341 | A | 4/2000 | Bingham et al. |
| 6,058,494 | A | 5/2000 | Gold et al. |
| 6,085,123 | A | 7/2000 | Baca et al. |
| 6,185,165 | B1 | 2/2001 | Jesionowski et al. |
| 6,327,519 | B1 | 12/2001 | Ostwald et al. |
| 6,327,594 | B1 | 12/2001 | Van Huben et al. |
| 6,328,766 | B1 | 12/2001 | Long |
| 6,336,172 | B1 | 1/2002 | Day, III et al. |
| 6,356,803 | B1 | 3/2002 | Goodman et al. |
| 6,360,232 | B1 | 3/2002 | Brewer et al. |
| 6,374,241 | B1 | 4/2002 | Lamburt et al. |
| 6,385,706 | B1 | 5/2002 | Ofek et al. |
| 6,425,035 | B2 | 7/2002 | Hoese et al. |
| 6,425,059 | B1 | 7/2002 | Basham et al. |
| 6,480,934 | B1 | 11/2002 | Hino et al. |
| 6,487,561 | B1 | 11/2002 | Ofek et al. |
| 6,493,721 | B1 | 12/2002 | Getchius et al. |
| 6,507,883 | B1 | 1/2003 | Bello et al. |
| 6,507,889 | B1 | 1/2003 | Tsurumaki et al. |
| 6,574,641 | B1 | 6/2003 | Dawson et al. |
| 6,604,165 | B1 | 8/2003 | Terao |
| 6,665,786 | B2 | 12/2003 | McMichael et al. |
| 6,675,260 | B2 | 1/2004 | Torrey et al. |
| 6,715,031 | B2 | 3/2004 | Camble et al. |
| 6,725,352 | B2 | 4/2004 | Goodman et al. |
| 6,725,394 | B1 | 4/2004 | Bolt |
| 6,738,885 | B1 | 5/2004 | Zhang et al. |
| 6,763,419 | B2 | 7/2004 | Hoese et al. |
| 6,772,231 | B2 | 8/2004 | Reuter et al. |
| 6,804,753 | B1 | 10/2004 | Moody, II et al. |
| 6,839,824 | B2 | 1/2005 | Camble et al. |
| 6,845,431 | B2 | 1/2005 | Camble et al. |
| 6,950,723 | B2 | 9/2005 | Gallo et al. |
| 7,136,988 | B2 | 11/2006 | Gallo |
| 7,146,244 | B2 | 12/2006 | Byers et al. |
| 7,199,809 | B1 | 4/2007 | Lacy et al. |
| 7,200,546 | B1 | 4/2007 | Nourmohamadian et al. |
| 7,370,173 | B2 | 5/2008 | Justiss et al. |
| 7,428,613 | B1 | 9/2008 | Justiss et al. |
| 7,451,291 | B2 | 11/2008 | Justiss et al. |
| 7,454,565 | B1 | 11/2008 | Justiss et al. |
| 7,505,980 | B2 | 3/2009 | Tyndall et al. |
| 2001/0020197 | A1 | 9/2001 | Nakano et al. |
| 2002/0004883 | A1 | 1/2002 | Nguyen et al. |
| 2002/0019863 | A1 | 2/2002 | Reuter et al. |
| 2002/0144048 | A1 | 10/2002 | Bolt |
| 2002/0169521 | A1 | 11/2002 | Goodman et al. |
| 2002/0188592 | A1 | 12/2002 | Leonhardt et al. |
| 2002/0199077 | A1 | 12/2002 | Goodman et al. |
| 2003/0014585 | A1 | 1/2003 | Ji |
| 2003/0070053 | A1 | 4/2003 | Gallo et al. |
| 2003/0084240 | A1 | 5/2003 | Torrey et al. |
| 2003/0126360 | A1 | 7/2003 | Camble et al. |
| 2003/0126361 | A1 | 7/2003 | Slater et al. |
| 2003/0126362 | A1 | 7/2003 | Camble et al. |
| 2003/0126395 | A1 | 7/2003 | Camble et al. |
| 2003/0126396 | A1 | 7/2003 | Camble et al. |
| 2003/0126460 | A1 | 7/2003 | Camble et al. |
| 2003/0131157 | A1 | 7/2003 | Hoese et al. |
| 2003/0131253 | A1 | 7/2003 | Martin et al. |
| 2003/0135580 | A1 | 7/2003 | Camble et al. |
| 2003/0212873 | A1 | 11/2003 | Lee et al. |
| 2003/0221054 | A1 | 11/2003 | Wu |
| 2004/0044828 | A1 | 3/2004 | Gibble et al. |
| 2004/0044871 | A1 | 3/2004 | Weber et al. |
| 2004/0054838 | A1 | 3/2004 | Hoese et al. |
| 2004/0064641 | A1 | 4/2004 | Kodama |
| 2004/0088513 | A1 | 5/2004 | Biessener et al. |
| 2004/0107300 | A1 | 6/2004 | Padmanabhan et al. |
| 2004/0111580 | A1 | 6/2004 | Weber et al. |
| 2004/0133915 | A1 | 7/2004 | Moody, II et al. |
| 2004/0139094 | A1 | 7/2004 | Tyndall et al. |
| 2004/0139240 | A1 | 7/2004 | DiCorpo et al. |
| 2004/0139260 | A1 | 7/2004 | Steinmetz et al. |
| 2004/0148460 | A1 | 7/2004 | Steinmetz et al. |
| 2004/0148461 | A1 | 7/2004 | Steinmetz et al. |
| 2006/0069844 | A1 | 3/2006 | Gallo et al. |
| 2006/0149919 | A1 | 7/2006 | Arizpe et al. |
| 2006/0174071 | A1 | 8/2006 | Justiss et al. |
| 2009/0049224 | A1 | 2/2009 | Justiss et al. |

FOREIGN PATENT DOCUMENTS

| | | |
|---|---|---|
| WO | WO 02/27463 A2 | 4/2002 |
| WO | WO03/104971 A1 | 12/2003 |
| WO | WO 2004/044783 A2 | 5/2004 |
| WO | WO 2004/044784 A2 | 5/2004 |

OTHER PUBLICATIONS

International Search Report for PCT/US 03/35822, Dec. 6, 2004.
Office Action issued in U.S. Appl. No. 11/046,019 dated Jan. 28, 2008.
Office Action issued in U.S. Appl. No. 10/880,360 dated Aug. 29, 2007.
Office Action issued in U.S. Appl. No. 10/704,265 dated Feb. 1, 2008.
CNET Glossary: Terms for the techie: controller, [online] pp. 1-2, downloaded from internet www.cnet.com/4520-6029_1-6040342-1.html?tag=txt retrived on Jul. 27, 2007.
CNET Glossary: Terms for the techie: crawler, [online] pp. 1-2, downloaded from internet www.cnet.com/4520-6029_1-6040342-1.html?tag=txt retrived on Jul. 27, 2007.
Griswold, "Storage Topologies", [online] pp. 1-8, downloaded from internet www.crossroads.com/Library/CollateralDownloads.asp on Jul. 27, 2007, Dec. 2002.
SGI—OpenVault Glossary of Terms, [online] pp. 1-8, downloaded from Internet: www.sgi.com/products/software/openvault/glossary/html on Jul. 27, 2007, 1993-2007, source SGI.
Tape Solutions: Router vs. Native Fibre Channel, Crossroads White Paper, pp. 1-7, Doc. Version #001, Crossroads Systems, Inc., Apr. 29, 2002.
U.S. Patent Office Official Action issued in U.S. Appl. No. 11/046,019, Justiss et al., May 9, 2007.
Working Draft NCITS T10 Project 999D, "Information Technology—SCSI-3 Medium Changer Commands (SMC)", pp. 1-68, Mar. 14, 1998.
Working Draft INCITS T10 Project 1383D, "Information Technology—SCSI Media Changer Commands-2 (SMC-2)", pp. i-x and 1-58, Nov. 18, 2003.
U.S. Patent Office Official Action issued Jul. 5, 2007 in U.S. Appl. No. 11/046,066, Justiss et al.
U.S. Patent Office Official Action issued Jun. 28, 2007 in U.S. Appl. No. 11/045,443, Justiss et al.
Office Action issued in U.S. Appl. No. 11/046,019 dated Jul. 23, 2008.
Office Action issued in U.S. Appl. No. 10/704,265 dated Jul. 21, 2008.
Office Action issued in U.S. Appl. No. 11/046,019, mailed Jan. 7, 2009, Justiss, 13 pages.

Office Action issued in U.S. Appl. No. 11/118,167, mailed May 12, 2009, Justiss, 38 pages.

Office Action issued in U.S. Appl. No. 10/704,265 mailed May 3, 2007, 16 pgs.

Office Action issued in U.S. Appl. No. 10/704,265 mailed May 19, 2006, 18 pgs.

Office Action issued in U.S. Appl. No. 10/880,162 mailed Aug. 30, 2006, 5 pgs.

Office Action issued in U.S. Appl. No. 10/880,360 mailed Aug. 30, 2006, 5 pgs.

Office Action issued in U.S. Appl. No. 10/704,265 mailed Nov. 14, 2006, 16 pgs.

Office Action issued in U.S. Appl. No. 10/880,162 mailed Feb. 12, 2007, 6 pgs.

Office Action issued in U.S. Appl. No. 10/880,360 mailed Feb 12, 2007, 6 pgs.

Office Action issued in U.S. Appl. No. 11/045,443, mailed Feb. 26, 2007, 13 pgs.

Office Action issued in U.S. Appl. No. 11/046,066, mailed Feb. 26, 2007, 17 pgs.

Office Action issued in U.S. Appl. No. 11/046,019, mailed Jun. 11, 2009, 15 pgs.

Ansi, SCSI-2 Specification archived on Jul. 12, 2002, retrieved from http://web.archive.org/web/20020712181903/http://ldkelley.com/SCS12/SCSI2-17.html on Jun. 9, 2009, 30 pgs.

Office Action issued in U.S. Appl. No. 11/118,167, mailed Nov. 27, 2009, 32 pgs.

Office Action issued in U.S. Appl. No. 11/046,019 mailed Dec. 14, 2009, 17 pgs.

Office Action issued in U.S. Appl. No. 12/237,969 mailed Oct. 14, 2009, 7 pgs.

Notice of Allowance issued in U.S. Appl. No. 12/237,969, mailed Feb. 22, 2010, 4 pgs.

* cited by examiner

SYSTEM AND METHOD FOR CONTROLLING ACCESS TO MEDIA LIBRARIES

RELATED APPLICATIONS

This Application claims priority under 35 U.S.C. §119(e) to U.S. Provisional Patent Application No. 60/425,034, entitled "A Method for Presenting a Single Logical Media Library Robotics Controller While Actually Operating Multiple Physical Media Library Robotics Controllers in an Aggregated Media Library Environment," filed Nov. 8, 2002, by inventors John Tyndall, William Moody and Robert Sims, the contents of which are fully incorporated by reference herein.

TECHNICAL FIELD OF THE INVENTION

The present invention relates to accessing media libraries. More particularly, the present invention relates to systems and methods of controlling access to physical media libraries.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a fibre channel to SCSI router), the tape libraries may be further addressed by bus number.

In current tape library systems, each tape library presents itself as an independent entity on the network. Each host in these systems maintains a view (i.e., a table of target numbers, LUNs and element numbers) of each of the tape libraries. Using this address information a host can format commands to the tape library to perform read/write, backup and other operations. In order to coordinate activities, hosts must cooperate with each other in issuing these commands. Enabling cooperation, however, requires reconfiguration of the hosts each time a new media library is added to the SAN. Moreover, to prevent conflicts between hosts, each host must typically use the same application to access a shared tape library. This can be inefficient as individual tape libraries cannot store data from multiple applications.

Prior art media libraries suffer additional shortcomings including lack of scalability. Currently, when an entity's need for storage outgrows the capabilities of its media library, the entity must, in many cases, purchase an additional independent media library. Because the independent media libraries present themselves as independent entities on a network, there is typically no single point of control for the libraries. Each host on the network will have access to each media library, often leading to conflicts.

One solution to this problem is an expandable media library in which physical units can be combined. In these systems, the robots which control the physical movement of media within a particular library can communicate with robots in connected libraries to transfer media such that the multiple libraries act as a single library. The use of multiple robots can allow some backup operations to continue even if one robot is offline. These systems, however, are often very expensive and require a large amount of space in single location so that the libraries can be connected together. Additionally, the entity installing such a system must have enough foresight to initially install a media library that is capable of expanding in this manner.

Another, more cost effective solution, is a set of modular media libraries that use a single robot. In these systems, each library installed after the initial library does not have its own robot, but, instead, is designed to stack on the initial library so that the robot from the initial library can move between the libraries. In essence, the libraries are combined into a single library using one robot. Again, however, this solution requires enough space in a single location and sufficient foresight on part of the installing entity to purchase a media library configured to allowing stacking. As a further deficiency, if the single robot experiences problems, the entity may not be able to perform any backup operations at all.

SUMMARY OF THE INVENTION

Embodiments of the present invention provide a system and method of controlling access to media libraries that eliminates, or at least substantially reduces, the shortcomings of prior art media library access systems and methods. More particularly, embodiments of the present invention provide a media library controller that can spoof drives to more effectively utilize media libraries. In one embodiment of the present invention, the media library controller can receive a command from a host that references a virtual media slot (e.g., a tape cartridge slot) and a virtual drive. The virtual media slot and virtual drive correspond to a physical media slot and a physical drive. The media library controller can spoof the physical drive corresponding to the virtual drive referenced in the command by mapping the command to another physical drive. The physical drive corresponding to the virtual drive in the command and the physical drive to which the command is actually forwarded can be part of the same physical media library or can be located at physically separate media libraries.

The media library controller can establish a virtual media library and associate the host with the virtual media library. The virtual media library can represent the portions of the physical media libraries to which the host is allowed access.

The media library controller can receive a command from the host that references a virtual media slot corresponding to a slot at a first media library and references a virtual drive that corresponds to a physical drive at a second physical media library. The media library controller can spoof the physical drive at the second physical media library by mapping the command to a physical drive at the first physical media library (i.e., at the same physical media library as the physical slot). The media library controller can forward the command to the drive at the first physical media library and the robot at the first physical media library to carry out the command. The forwarding of the command can include changing the command to map the command from the virtual slots, drives and robots seen by the host to the physical drives, slots and robots at the physical media library.

In another embodiment of the present invention, the media library controller can present the virtual media library to the host such that the host sees a media library with a virtual drive, virtual robot and virtual slots (i.e., the host will see a virtual robotic controller and virtual slots). The host can then form commands based on the virtual media library (e.g., based on the addressing information seen by the host). When the media library controller receives the command, the media library controller can forward the command to the robot and/or drives at the physical media library to which the host has access based on a mapping of the virtual drive(s), virtual robot(s) and virtual slots to physical drives, robots and slots. If the command references slots and drives at different physical media libraries or otherwise references a drive that is not accessible (e.g., a drive that is busy), the media library controller can spoof the physical drive referenced in the command (i.e., the physical drive corresponding to the virtual drive upon which the command is based) by mapping the command to another physical drive.

Another embodiment of the present invention can include a set of computer instructions executable by a computer processor to receive a command from a host that references a virtual media slot representing a physical media slot at a physical media library and a virtual drive representing a first physical drive. The computer instructions can be further executable to spoof the first physical drive with a second physical drive by, in one embodiment of the present invention, mapping the command to the second physical drive rather than the first physical drive. The first physical drive and the second physical drive used to spoof the first physical drive can be at the same or different physical media libraries. The instructions can be further executable to forward the command to the media library containing the physical slot corresponding to the virtual slot referenced in the command. Forwarding of the command can include forwarding a portion of the command, such as a move element portion, to a robot and another portion, such as a write portion, to the second physical drive. Additionally, forwarding of the command can include mapping the command from the virtual media library to the physical media library to which the command is forwarded.

Yet another embodiment of the present invention can include a method of controlling access to media libraries that includes: (i) receiving a command from the host, wherein the command references a virtual media slot representing a first physical media slot at a first physical media library and a virtual drive representing a first physical drive; (ii) spoofing the first physical drive with a second physical drive from first physical media library; and (iii) forwarding the command to the first physical media library. In one embodiment of the present invention, the command can be changed during forwarding to account for the mapping between virtual drives, robots and slots and physical drives, robots and slots.

The present invention provides an advantage over prior art systems and methods of aggregating media libraries by providing a single point of control for multiple media libraries without requiring that the media libraries be preconfigured to connect with existing media libraries. This can substantially reduce the complexity and cost of expanding data storage abilities.

Embodiments of the present invention provide another advantage over prior art systems of aggregating media libraries by allowing hosts running different applications to share media libraries. Because multiple hosts can share the same physical media libraries, data can be stored more efficiently. Moreover, because access can be controlled at a central point, the hosts do not have to be extensively reconfigured to allow sharing without conflict.

In addition, embodiments of the present invention provide another advantage over prior art systems by allowing a central control point to be established for media libraries that may reside at different locations. This can reduce the amount of space required at a single location for expanding media libraries.

Embodiments of the present invention provide yet another advantage over prior art systems by allowing a host to access media (e.g., tape cartridges) from different media libraries.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for providing a central point of control for multiple, physically separate media libraries. By providing a central point of control, embodiments of the present invention can eliminate, or substantially reduce, conflicts between multiple hosts attempting to access the same media libraries. In the preferred embodiment, a plurality of hosts are connected to multiple tape libraries via a fibre channel storage area network ("SAN"). Each tape library includes one or more tape drives to perform read/write operations and slots to store tape cartridges and utilizes a robot to load individual tape cartridges into the tape drives. A media library controller is connected to the SAN between the hosts and the media libraries and acts as a central control point for the libraries. The controller can maintain a virtualized aggregate media library representing each of the media libraries behind the controller. The controller can also maintain a set of virtual media libraries with each virtual media library representing portions of one or more physical media libraries behind the controller. By associating each host with a virtual media library such that the host can only have access to certain portions of the physical media libraries, the media library controller can reduce conflicts between the hosts.

Figure 1:
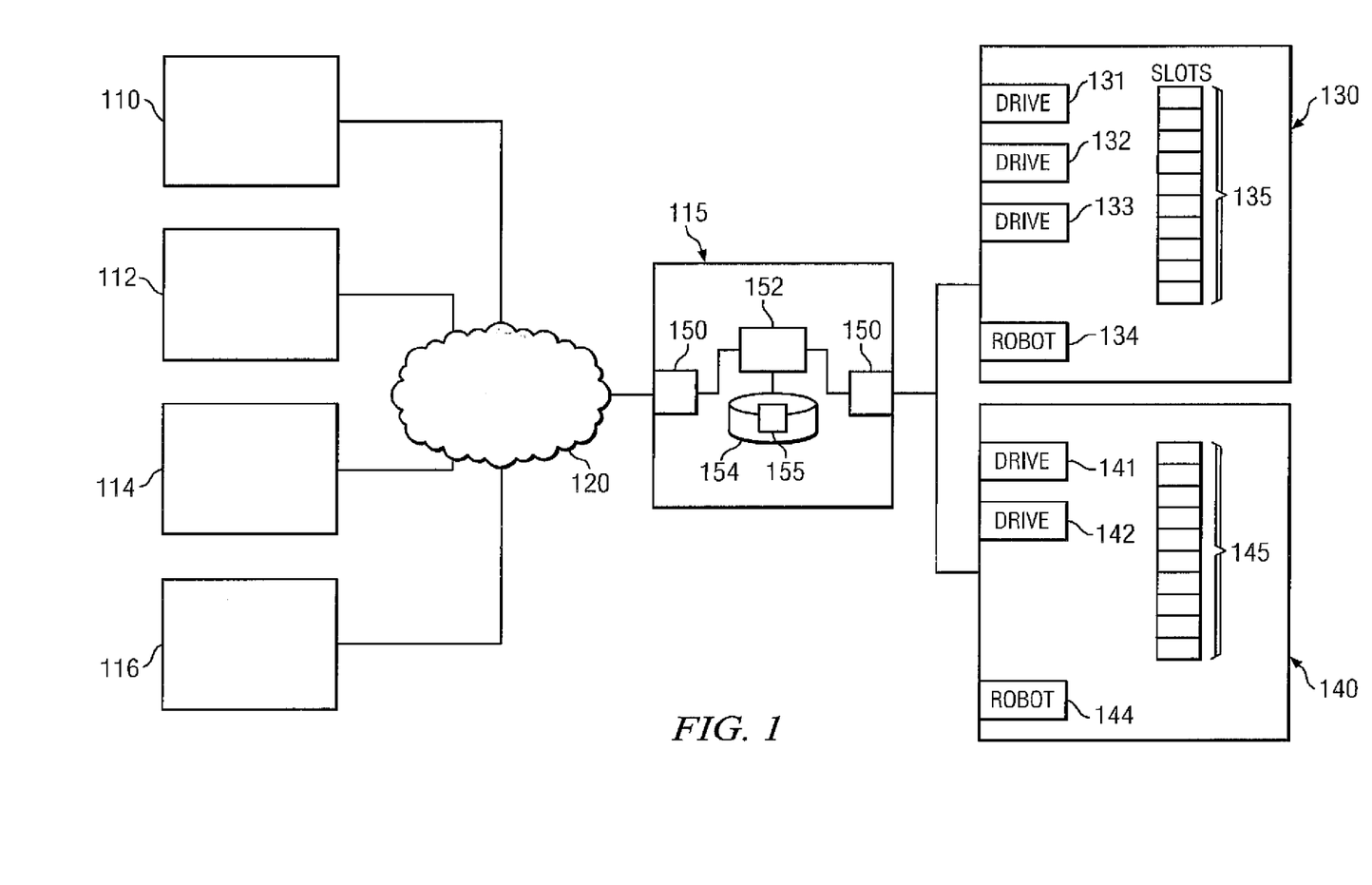
FIG. 1 is a diagrammatic representation of a system in which a plurality of hosts have access to multiple media libraries on a network according to one embodiment of the present invention.

FIG. 1 is a diagrammatic representation of a system 100 in which a plurality of hosts have access to multiple media libraries on a network. In this embodiment, hosts 110, 112, 114 and 116 are coupled to a media library controller 115 via network 120. The media library controller controls access to media libraries 130 and 140. In the preferred embodiment, network 120 is a fibre channel SAN and media libraries 130 and 140 connect to media library controller 115 by either fibre channel or SCSI connections. Network 120, in other embodiments of the present invention, can comprise the Internet, a LAN, a WAN, a wireless network or any other communications network known in the art. Similarly, media libraries 130 and 140 can communicate with media library controller 115 over any suitable communications link or network known in the art and can use additional protocols such as iSCSI, TCP/IP, or other protocol known in the art.

Media library 130 and media library 140, in the preferred embodiment of the present invention, comprise tape libraries, though, in other embodiments, the media libraries can comprise any media library known in the art such as optical jukeboxes. A tape library, as would be understood by one of ordinary skill in the art, typically consists of one or more tape drives that can accept tape cartridges, read/write data from/to magnetic tapes in tape cartridges, eject tape cartridges and perform other operations. A series of slots stores tape cartridges when they are not in a drive and a robot moves the tape cartridges between the drives and slots. As an example, media library 130 can comprise drives 131-133, robot 134 and slots 135 (individually slots 135a-j) while media library 140 can comprise drives 141-142, robot 144 and slots 145 (individually slots 145a-j). Media libraries 130 and 140, in the preferred embodiment, are physically separate from each other. That is, even if media libraries 130 and 140 are in physical contact with each other, they can not pass tape cartridges back and forth. It should be noted that a media library that employs a single robot or multiple robots in an expandable or modular configuration, but presents itself as a single media library to a network, can be considered a single media library for the purposes of this application.

Media library controller 115 can comprise one or more communications interfaces (e.g., fibre channel interface, Ethernet port or other communications interface known in the art) to connect media library controller 115 to SAN 120 and media libraries 130 and 140. Additionally, media library controller 115 can comprise a computer processor 152 and a computer readable memory 154 (e.g., RAM, ROM, magnetic disk, optical disk and/or any other computer readable memory known in the art) that can store computer instructions 155, which are executable by processor 152. Computer instructions 155 can be implemented as hardware, software, firmware or in any other suitable manner as would be understood by those of ordinary skill in the art.

It should be understood that media library controller 115 can be implemented in a variety manners. For example, when implemented in a SAN, the media library controller can be part of a fibre channel-to-SCSI router, part of a media library to which other media libraries are connected or at any other location in the command flow path.

In operation, computer instructions 155 can be executable such that media library controller 115 can maintain a virtualized aggregate media library representing the drives, slots and robots available at physical media libraries 130 and 140. In other words, media library controller 115 can maintain a composite view of the physical media libraries to which it is connected. Additionally, media library controller 115 can associate each host with a virtual media library that represents the robots, drives and slots on the particular physical media libraries accessible by the associated host. In one embodiment of the present invention, a host will only see the robots, drives and slots that it is authorized to access. When a host issues a command referencing a virtual drive and slot in a virtual media library, media library controller 115 can determine if the command references a portion of the physical media libraries to which the host has access and, if so, forward the command to the corresponding physical drive and robot. To forward the command, media library controller 115 can, if necessary, translate the command received from the host into a format usable by the physical robot to find particular tape cartridges. It should be noted that a data operation command will typically have two portions, one directed to the robot to, for example, move a tape cartridge from a slot to a drive and one directed to the drive to perform an operation such as reading, writing or ejecting a tape. However, some data operation commands may have only a drive portion (e.g., to read or write if a tape cartridge is already in a drive) or a robot portion (e.g., to move a tape cartridge between slots).

Figure 2:
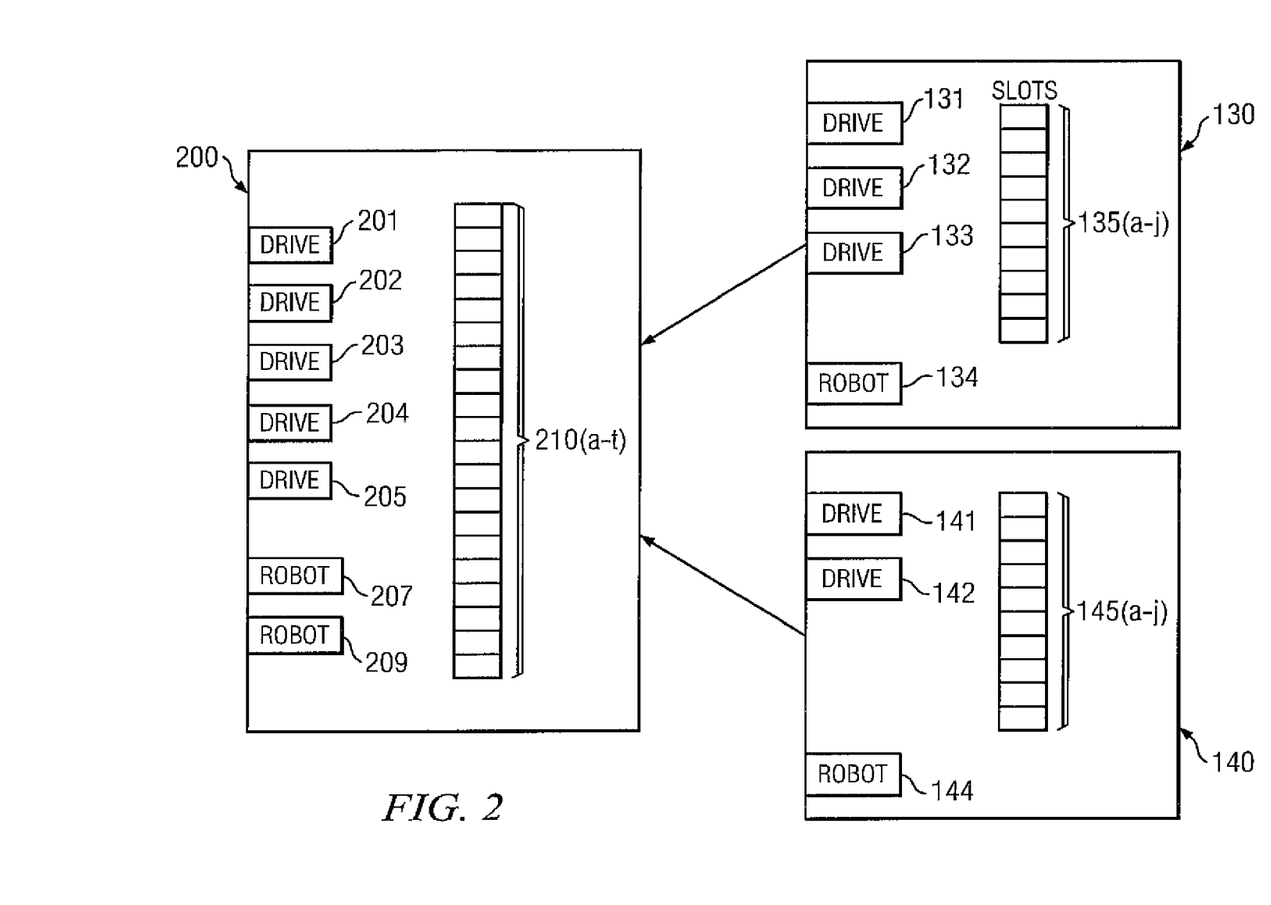
FIG. 2 is a diagrammatic representation of the physical to logical conversion of drives and slots from multiple physical media libraries to a virtualized aggregate media library at a media library controller according to one embodiment of the present invention.

FIG. 2 is a diagrammatic representation of the physical to logical conversion of drives and slots from multiple physical media libraries to a virtualized aggregate media library at a media library controller. In the embodiment of FIG. 2, a media library controller (e.g., media library controller 115 of FIG. 1) can map the drives and slots of physical media libraries 130 and 140 to virtualized aggregate media library 200.

In one embodiment of the present invention, a media library controller can contain a map of physical drives 131, 132, 133, 141 and 142, represented by logical drives 201-205, and a map of physical slots 135a-j and 145a-j, represented by logical slots 210a through 210t. Additionally, the media library controller can map robots 134 and 144, represented by logical robots 207 and 209, respectively. Virtualized aggregate media library 200, thus, represents the media library controller's view of the separate physical libraries that may have duplicate addresses for drives and robots.

If tape libraries 130 and 140 are SCSI tape libraries, for example, the media library controller can maintain virtualized aggregate media library 200 as a table of the target numbers and LUNs for physical drives and physical robots and a table of element numbers for the slots and drives at each physical media library. Table 1 is an example of a table that can be maintained by the media library controller as its "view" of the connected physical libraries. It should be noted that this table is provided by way of example only. It should be further noted that the data in Table 1 can be maintained as one table, multiple tables (e.g., an address and element number table) as a file, as a database, or in any other format known in the art.

TABLE 1

| SCSI BUS | Target | LUN | Element Number | Corresponding Physical Drive/Slot/Robot |
|---|---|---|---|---|
| 1 | 1 | 0 | 3 | drive 131 |
| 2 | 1 | 0 | 3 | drive 141 |
| 1 | | | 4 | slot 135a |
| 1 | | | 5 | slot 135b |
| 1 | | | 9 | slot 135h |
| 2 | | | 5 | slot 145i |
| 2 | | | 8 | slot 145m |
| 1 | 1 | 4 | | robot 134 |
| 2 | 1 | 0 | | robot 144 |

By maintaining a mapping of targets, LUNs and element numbers, the media library controller can maintain an aggregate view of the tape libraries which it controls. The addressing information contained in Table 1 is provided by way of example only and any addressing information sufficient to forward commands from the media library controller to the connected media libraries can be used to maintain virtualized aggregate media library 200.

Figure 3:
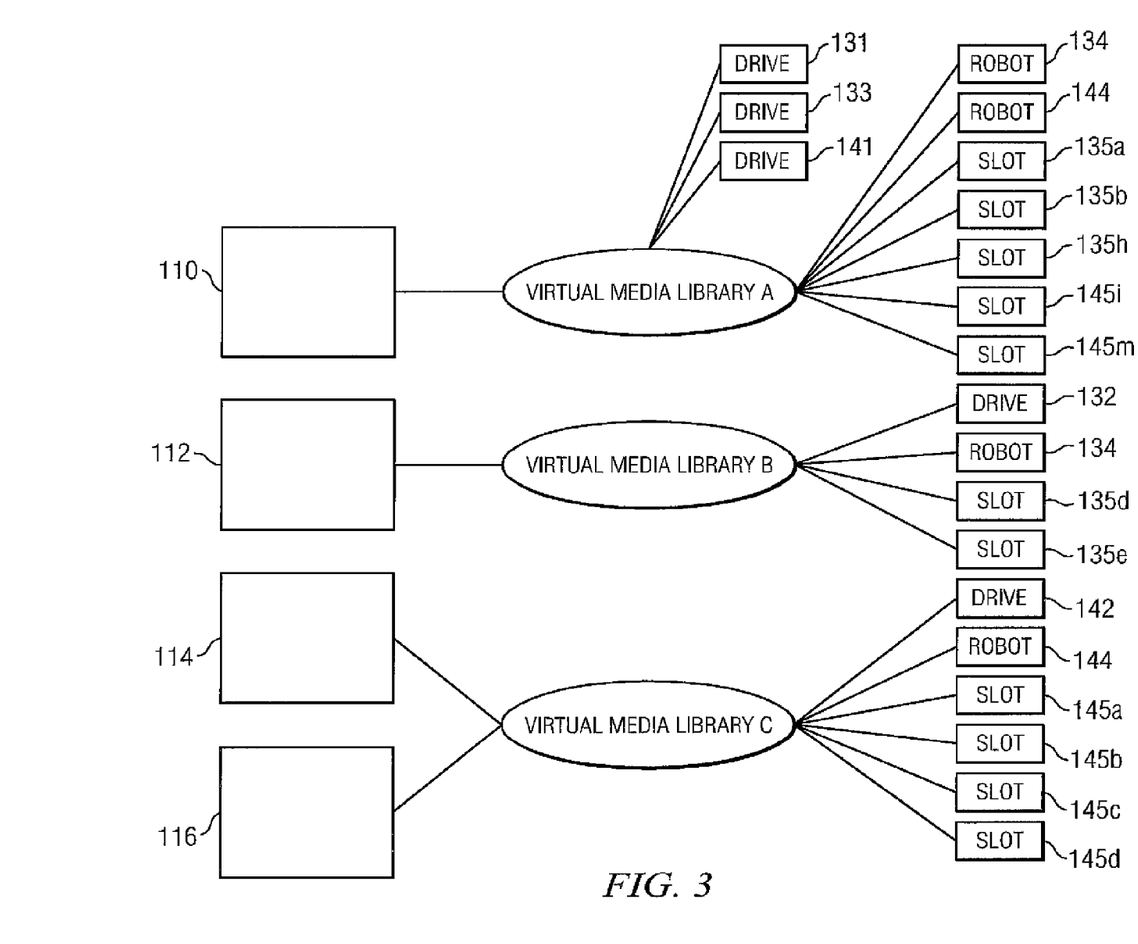
FIG. 3 is a diagrammatic representation illustrating the association of hosts, robots, drives and cartridge slots with particular virtual media libraries according to one embodiment of the present invention.

In addition to maintaining a virtualized aggregate media library 200, the media library controller can associate hosts with virtual media libraries. Each virtual media library represents the robots, drives and cartridge slots accessible by an associated host. FIG. 3 is a diagrammatic representation illustrating the association of hosts, robots, drives and cartridge slots with particular virtual media libraries according to one embodiment of the present invention. It can be seen from this figure that drive 131, drive 133, drive 141, robot 134 and robot 144 are assigned to virtual media library A. It should be noted that although a host can have access to multiple robots, the media library controller, in one embodiment of the present invention, might only present a single virtual robot to the host. In addition to robots and drives, each host can be associated with a pool of cartridge slots. For example, the pool including slot 135a, 135b, 135h, 145i and 145m can be assigned to virtual media library A. Because host 110 is associated with Virtual Media Library A, host 110 can issue commands to drives 131, 133, 141, robot 134 and robot 144 to affect the tapes in slots 135a, 135b, 135h, 145i and 145m. Similarly, because host 112 is associated with Virtual Media Library B, host 112 can access slots 135d-e (i.e., slot Pool B) and use drive 132 and robot 134. In the third example, two hosts are associated with Virtual Library C. This can occur, for example, when the hosts are running applications that can coordinate backup activities (e.g., via homogeneous applications). Because hosts 114 and 116 are associated with Virtual Library C, each can issue commands to drive 142 and robot 144 to manipulate the tapes in physical slots 145a-d.

As shown in FIG. 3, each virtual library can contain the drives, slots and robots that can be accessed by a particular host. Each virtual media library, therefore, represents the portions of physical media libraries accessible by a host. A method of partitioning the slots in a physical media library into pools is described in U.S. patent application Ser. No. 10/065,329, entitled "Partitioned Library," to Moody et al., which is hereby fully incorporated by reference herein.

The slots discussed above are each included in only one of the pools and, hence, only one of the virtual media libraries. The drives and robots, however, may be shared by multiple virtual media libraries. In order to avoid conflicts between hosts concurrently accessing the same drive or robot, the media library controller can establish access rules such as first come first served, giving priority to particular hosts or other such rules. In other embodiments of the present invention, there may be overlap between the slot pools. For instance, some slots may be shared as import/export slots that allow tapes to be transferred between pools.

By associating hosts with virtual media libraries, a media library controller can filter out tape access commands that affect drives, robots or slots not associated with a particular host. For instance, if host 110 attempts to access the tape in slot 135d, the media library controller can recognize that the target slot is not in the slot pool of Virtual Media Library A and can reject the command. Rejection of unauthorized commands can be handled in various manners, such as discarding the command without notification to the host, returning an error indication or in another manner.

A Media library controller can also control access to each host in a variety of other ways, such through the access control method described in U.S. Pat. No. 5,941,972 entitled "Storage Router and Method for Providing Virtual Local Storage," to Hoese, which is hereby fully incorporated by reference herein. In another embodiment of the present invention, access can be controlled by presenting the hosts with virtual drives, robots and slots and mapping the virtual robots, drives and slots to physical drives, robots and slots. In this embodiment, the hosts do not see drives, robots or slots that they are not allowed to access, but only see the virtual drives, robots and/or slots in the virtual media library with which they are associated. Rather than simply filtering commands, the media library controller can thus act as a virtualization layer between the physical media libraries and the hosts. One example of System and Method for access to media libraries is described in U.S. patent application Ser. No. 12/391,034, entitled "System and Method for Controlling Access to Multiple Physical Media Libraries," filed Feb. 23, 2009, by John Tyndall and William Moody, which is hereby incorporated by reference in its entirety.

Figure 4:
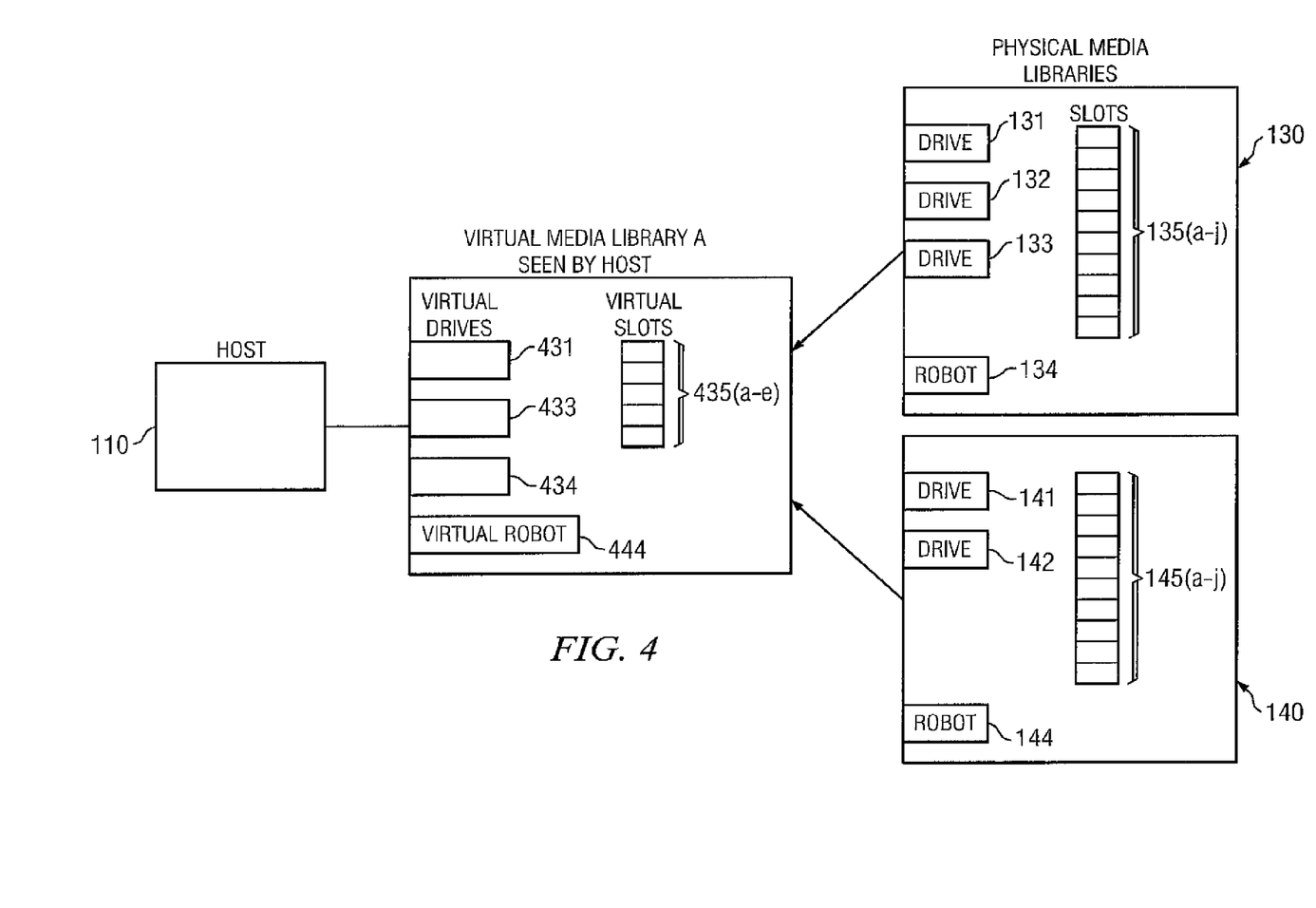
FIG. 4 is a diagrammatic representation illustrating the conversion of physical robots, drives and slots to virtual robots, drives and slots that can be seen by a host in accordance with one embodiment of the present invention.

FIG. 4 is a diagrammatic representation illustrating the conversion of physical robots, drives and slots to virtual robots, drives and slots that can be seen by a host in accordance with one embodiment of the present invention. In FIG. 4, the example of Virtual Media Library A from FIG. 3 is used. The robot, drives and slots of Virtual Media Library A can be assigned any target numbers, LUNs and element numbers by a media library controller to map the physical robots, drives and slots to virtual counterparts. Thus, physical drive 131 can be represented by virtual drive 431, physical drive 133 can be represented by virtual drive 433, physical drive 141 can be represented by virtual drive 434 and physical slots 135a, 135b, 135h, 145i and 145m can be represented by virtual slots 435a-e. Additionally, in one embodiment of the present invention, physical robot 134 and physical robot 144 can be represented by a single virtual robot 444. As would be understood by those of ordinary skill in the art, the virtual media library can thus be presented as virtual tape drives, a virtual robotic controller (i.e., can be presented with information showing a virtual robot with access to virtual drives) and virtual slots. Media library controller 115 can maintain a mapping of the virtual drives, robots and slots to the corresponding physical drives, robots and slots.

The host can generate commands based on the virtual media library with which it is presented and the media controller can forward the commands to the appropriate robot and drive based on the mappings maintained by the media controller. For example, the media controller may present Virtual Media Library A to the host as having the properties in Table 2.

TABLE 2

| Virtual SCSI Bus | Virtual Target | Virtual LUN | Virtual Element Number | Physical Corresponding Physical Drive/Slot/Robot |
|---|---|---|---|---|
| 1 | 1 | 1 | 1 | drive 131 |
| 1 | 2 | 2 | 2 | drive 133 |
| 1 | 3 | 3 | 3 | drive 141 |
| 1 | | | 4 | slot 135a |
| 1 | | | 5 | slot 135b |
| 1 | | | 6 | slot 135h |
| 1 | | | 7 | slot 145i |
| 1 | | | 8 | slot 145m |
| 1 | 2 | 3 | | robot 134 and robot 144 |

The virtual attributes of Table 2, which are given by way of example only, can represent those seen by host 110 (i. e., as presented by a media library controller). Thus, for example, host 110 may see a virtual drive corresponding to physical drive 131 as being at LUN 1, whereas physical drive 131 may actually be at LUN 0 (as shown in Table 1). When host 110 issues commands referencing physical drive 131, the command can be directed to the virtual attributes presented by the media controller. In other words, the commands can be based on host 110's view that physical drive 131 is at LUN 1. The media library controller can map the command to drive 131 and forward the command to that drive.

It should be noted that forwarding of the command may include changing the command to map the command from virtual slots, drives and robots to physical slots, drives and robots. For example, if host 110 issues a command for robot 134 to place the tape cartridge from slot 135a in drive 131, host 110 can issue the command based on the virtual attributes with which it is presented. Thus for example, host 110 can direct the command to a robot at SCSI Bus 1, Target 2, LUN 3 to move a tape cartridge from the cartridge slot at SCSI Bus 1, element 4 to the drive at SCSI Bus 1, element 1. Additionally, the host can address the read/write portion of the data operation command to the drive at SCSI Bus 1, Target 1, LUN 1.

The media controller, upon receipt of the command, can map the command to, for example, reference the element numbers for physical drive 131 and physical slot 135a. Because the data operation command affects a tape cartridge stored in the first physical media library, the commands directed to the virtual robot can be mapped to physical robot 134 to move the tape cartridge from slot 135a to drive 131. Thus, the command received from host 110, which can reference virtual element number 4 for drive 131 and virtual element number 1 for slot 135a, can be mapped to reference physical element number 1 for drive 131 and physical element number 4 for slot 135a. Additionally, the read/write portion of the data operation command can be mapped to physical drive 131. Forwarding the command, then, can include forwarding the command unchanged if the virtual and physical attributes are the same, or changed if virtual attributes must be mapped to physical attributes.

As can be noted from Table 2, the physical and virtual counterparts do not have to share the same target number, LUNs and/or element numbers. Thus, slot 435c, which represents physical slot 135h, can be assigned a different element number, for example, than that assigned to physical slot 135h. Host 110 could therefore see physical slot number 8 (i.e., slot 135h) of media library 130 as slot number 3. Because any address attributes can be assigned to a virtual drive, robot or slot, media library controller 115 can similarly configure a virtual drive presented to host 111 as slot number 3. Thus, host 111 may also see physical slot number 4 (i.e., slot 135d) as virtual slot number 3. Different hosts may thereby access what is seen by each as the same cartridge slot, when in reality, each host is accessing a different cartridge slot (assuming the hosts are associated with different pools). Furthermore, as can be seen in FIG. 4, the virtual media library does not have to correspond to an entire physical media library, but may represent a subset or portion of the physical media library. If a new host is associated with Virtual Media Library A, that host will see the same virtual drives, robots and slots as host 110 and will, consequently, have access to the same portion of physical media library 130 and physical media library 140 at host 110.

Virtual Media Library A, in FIG. 4, includes slots and drives from both physical media library 130 and physical media library 140. Host 110, in one embodiment of the present invention, will, thus, see a single media library with virtual drives and slots that represent physical drives and slots from multiple physical media libraries. Consequently, host 110 may, for example, issue a command to place the tape cartridge from virtual slot 435a, corresponding to physical slot 135a, into virtual drive 434, corresponding to physical drive 141. The tape cartridge in physical slot 135a, however, can not be placed in physical drive 141 as physical media library 140 and physical media library 130 are physically separate.

To account for the fact that host 110 may issue a command to perform operations on a tape cartridge from one physical media library with a drive of another physical media library, the media library controller can redirect the command to a drive at the same physical media library as the tape cartridge. For example, if host 110 issues a command to move the tape cartridge in physical slot 135a to drive 141 (e.g., issues a command to move the tape cartridge in virtual slot 435a to virtual drive 434), the media library controller can direct the command to physical robot 134 and change the command to move the cartridge in physical slot 135a to one of the drives in physical media library 130 (e.g., drive 131, drive 132 or drive 132). Additionally, the media library controller can redirect the read/write portions of the data operation command to the appropriate physical drive. Host 110 thus believes it is issuing commands to virtual drive 434, and hence, corresponding physical drive 141, while the media library controller is redirecting the commands to another physical drive. In other words, the media library controller can "spoof" drive 141 by redirecting commands for physical drive 141 to a physical drive at physical media library 130.

Spoofing can also occur when, for example, two or more hosts request the use of the same physical drive. For example, if host 110 makes a request to place the cartridge in physical slot 135b into drive 131 but drive 131 is already in use (e.g., due to a command from another host), the media library controller can change the request to place the tape cartridge from physical slot 135b into physical drive 132 and can redirect commands from host 110 to physical drive 132. Thus, the media library controller can spoof a drive referenced by a command with another drive to ensure that the command can be carried out.

Figure 5:
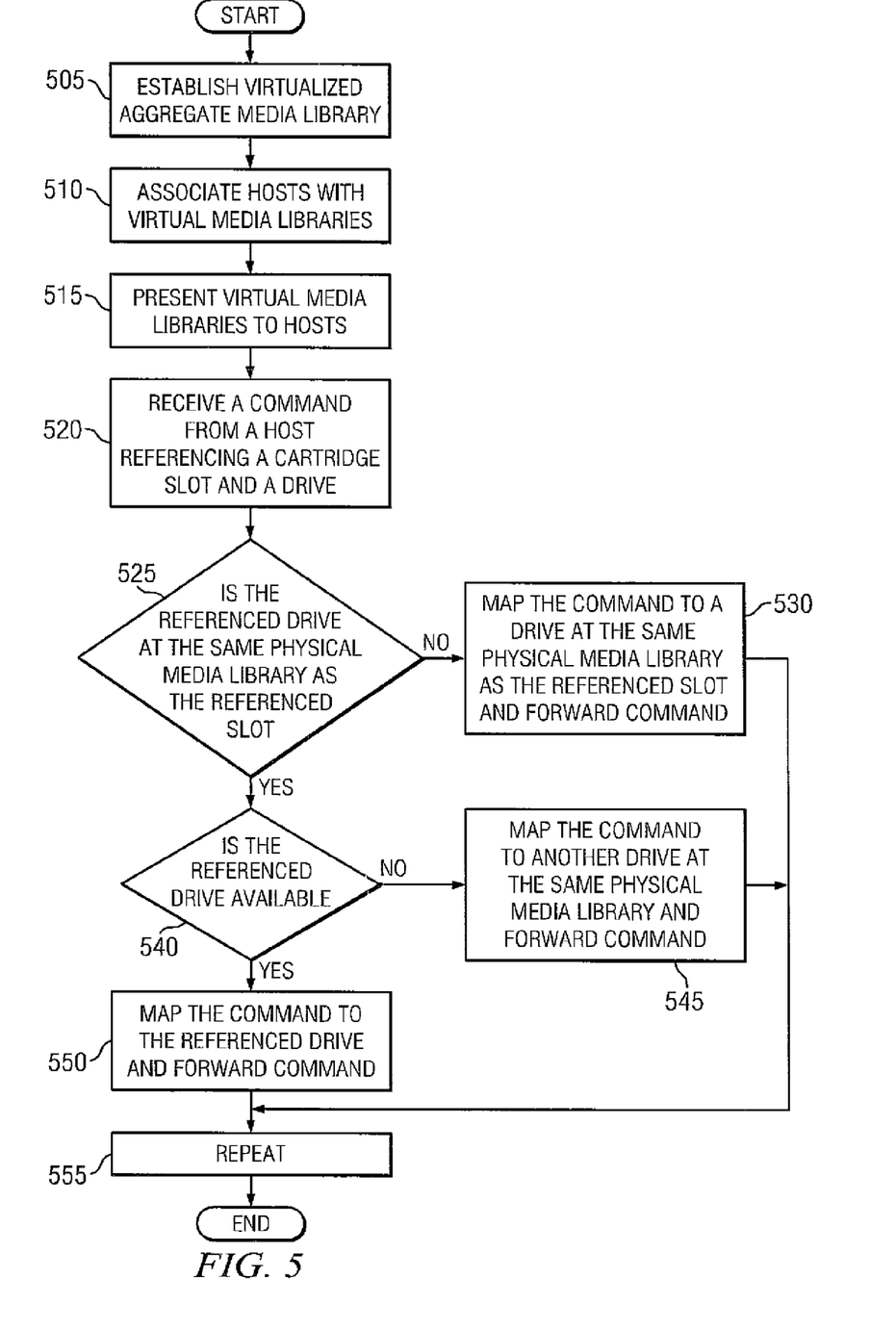
FIG. 5 is a flow diagram illustrating a method for controlling access to multiple media libraries according to one embodiment of the present invention.

FIG. 5 is a flow diagram representing one embodiment of a method for controlling access to media libraries. At step 505, a media library controller can establish a virtualized aggregate media library by, for example, querying the media libraries attached to the media library controller, gathering information from a management information database, performing device discovery, receiving input from a systems administrator or in any other manner known in the art. In the case of a SCSI environment, the virtualized aggregate media library can include the information necessary to communicate with attached media libraries, such as target numbers, bus numbers, element number, LUNs or any other information needed to address commands to the particular physical media libraries. As would be understood by one of ordinary skill in the art, the particular contents of the virtualized aggregate media library can depend on the protocol used to communicate with physical media libraries and the information needed to forward commands to the physical media libraries. Moreover, it should be noted that, in some embodiments of the present invention, the virtualized aggregate media library may only represent the portions of physical media library to which the media library controller provides access.

At step 510, the media library controller can associate hosts with virtual media libraries. Each virtual media library can represent the portions of the physical media libraries to which the associated host has access. In the case of tape libraries, the virtual media libraries can include the robots, drives and cartridge slots to which a host has access. The cartridge slots can be associated in pools with a particular host, with cartridge slots in a pool coming from one or more physical media libraries. In one embodiment of the present invention, the pools will no overlap. Thus, only hosts associated with a particular virtual media library will be able to access a particular cartridge slot. In other embodiments of the present invention, the pools can overlap to provide, for example, import/export slots so that tape cartridges can be passed between pools. Each virtual media library can be associated with zero, one or multiple hosts.

The media library controller, at step 515, can present the virtual media libraries to hosts so that each host can see the virtual media library with which it is associated. To present a virtual media library, the media library controller can map the attributes of the physical media libraries to virtual media libraries and present the virtual attributes to the hosts. In the case of a tape library, for example, the media library controller can map the physical drives, slots and robots to virtual drives, slots and robots. The media library controller, in one embodiment of the present invention, can present a single virtual robot that represents the physical robots at the physical media libraries. When a hosts looks for available tape libraries on the network, the media library controller can present the virtual tape library as a tape library available to that host. The host can then format data operation commands based on the virtual media library with which it is presented.

At step 520, the media library controller can receive a command from a host. Because the host sees the virtual drives, robot and slots presented to it by the media library controller (i.e., sees a virtual robotic controller, virtual drives and virtual slots), the command can reference the virtual drives, slots and/or robot. The media controller, at step 525, can determine if the physical drive referenced by the command (i.e., the physical drive corresponding to the virtual drive referenced in the command) is at the same physical media library as the physical cartridge slot referenced by the command (i.e., the physical cartridge slot corresponding to the virtual cartridge slot referenced by the command). If, at step at step 525, the media library controller determines that the physical drive and cartridge slot referenced by the command are at different physical media libraries, the media library controller, at step 530, can spoof the physical drive referenced by the command with a physical drive at the same media library controller as the physical cartridge slot referenced by the command. In one embodiment of the present invention, spoofing can include mapping the command to a physical drive at the same physical media library as the physical cartridge slot referenced in the command rather than mapping the command to the physical drive actually referenced in the command. Additionally, the media library controller can map the command to the physical cartridge slot corresponding to the virtual cartridge slot referenced in the command and the physical robot at the same physical media library as the physical cartridge slot.

The media library controller, at step 530, can also forward the command to the physical drive and robot to which the command is mapped. Forwarding of the command can include changing the command to account for differences between the virtual attributes (e.g., LUNS, element numbers, bus numbers and other attributes known in the art) of the virtual drive, slot and robot upon which the command is based and the attributes of the physical drive, slot and robot affected by the command. Forwarding of the command to the physical media library can also include forwarding a portion of the command (e.g., a read/write portion) to a drive at the physical media library and/or forwarding another portion (e.g., a move-element portion) to a robot at the media library.

As can be understood from the above example, spoofing can occur to redirect commands from a physical drive at one physical media library to a physical drive at another physical media library. However, spoofing can also occur between drives in a single physical media library when, for example, the physical drive referenced by a command is, for some reason, unavailable (e.g., the drive is inoperative or busy). Thus, even if the media library controller determines at step 525 that the physical drive and physical cartridge slot referenced by the command are at the same physical media library, the media library controller can spoof the referenced physical drive. This can occur, for example, if the media library controller, at step 540, determines if the referenced physical media drive is unavailable. The media library controller can spoof the referenced drive by, for example, mapping the command to another physical drive at the same physical media library (step 545). Additionally, the media library controller can map the command to the physical cartridge slot corresponding to the virtual cartridge slot referenced in the command and the physical robot at the same physical media library as the physical cartridge slot (step 545). Also at step 545, the media library controller can forward the command to the physical drive and/or physical robot to which the command is mapped. In this manner, the command can be carried out even though the drive referenced in the command is unavailable.

In one embodiment of the present invention, if, at step 525, the media library controller determines that physical drive and physical cartridge slot referenced by the command are at the same physical media library and, at step 540, that the physical drive referenced by the command is available, the media library controller can map the command from the virtual drive, slot and robot upon which the command is based to the physical counterparts at the physical media library (step 550). Additionally, at step 550, the media library controller can forward the command (changed to account for the mapping between virtual and physical attributes, if necessary) to the appropriate physical drive and/or robot. The media library controller can optionally repeat the method of FIG. 5 (step 555).

In summary, the media library controller can receive a command from a host that references a virtual drive representing a physical drive and a virtual media slot representing a physical media slot. If the physical drive referenced by the command (i.e., the physical drive corresponding to the virtual drive referenced by the command) is not at the same physical media library as the physical media slot referenced by the command (i.e., the physical media slot corresponding to the virtual media slot referenced by the command) or if the physical drive is not available, the media library controller can spoof the physical drive referenced in the command with another drive at the same physical media library as the physical media slot referenced by the command. In one embodiment of the present invention, this can be done by mapping the command to the another physical drive rather than the physical drive referenced in the command. Additionally, the media library controller can map the virtual cartridge slot to a physical cartridge slot and a virtual robot to a physical robot at the same physical media library as the physical cartridge slot. The media library can forward the command, changed, if necessary, to account for the mapping between virtual attributes and physical attributes, to the physical media library. Forwarding of the command (changed or unchanged) can further include forwarding a portion to the physical drive and a portion to the physical robot. The media library controller, in one embodiment of the present invention, can continue to spoof the physical drive referenced in the command, at least with respect to a particular host, until the media cartridge is removed from that drive.

The media library controller provides a central point of control for multiple, physically separate media libraries. By providing a central point of control, embodiments of the present invention can eliminate or substantially reduce conflicts between multiple hosts attempting to access the same media libraries. In the preferred embodiment, a plurality of hosts are connected to multiple tape libraries via a fibre channel storage area network ("SAN"). Each tape library includes one or more tape drives to perform read/write operations and slots to store tape cartridges and utilizes a robot to load individual tapes into the tape drives. The media library controller is connected to the SAN between the hosts and the media libraries and acts as a central control point for the libraries. The media library controller can maintain a virtualized aggregate view of the physical media libraries to which it is connected and create a set of virtual libraries that represent partitions of the physical libraries. Hosts can be associated with the virtual libraries so that each host can only access the portions of the physical media libraries with which it is associated.

Although described as a separate unit in the embodiment of FIG. 1, the media library controller can be implemented at various spots in the command flow path, including at a fibre channel-to-SCSI router or at one of the physical media libraries. In these embodiments, memory and processing can be shared with other components. Embodiments of the present invention can also be implemented with respect to libraries of media other than magnetic tapes. For example, the media library can comprise a plurality of optical disks (i.e., an optical jukebox) or removable hard drives. The media library can contain any type of information, including but not limited to raw data, audio and video. Furthermore, the media library controller can include an interface for the administration and management of the device.

Embodiments of the present invention provide advantages over prior art systems of managing media libraries by allowing multiple separate media libraries to be aggregated at a single point of control. Because the media libraries are independent, each will have its own robot or robots. This can allow backup operations to continue even if one of the media libraries experiences problems. The advantages of a multiple robot media library can thereby be achieved through the use of less expensive independent media libraries. Additionally, because embodiments of the present invention can partition multiple media libraries at a central control point, hosts running different applications can share portions of the same group of media libraries without conflict and without extensive reprogramming.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A controller for controlling access to media libraries, said controller comprising:
 a host interface to connect to one or more hosts via a transport medium;
 one or more storage interfaces to connect to a plurality of physically separate media libraries over one or more additional transport mediums;
 a computer processor;
 a computer memory coupled to the computer processor, the computer memory storing a set of computer instructions executable by the computer processor to:
  associate hosts with virtual media libraries that map to media library components at physically separate media libraries;
  receive a command from the host, wherein the command references a first virtual media slot and a first virtual drive of a first virtual media library, wherein the first virtual media slot maps to a first physical media slot at first physical media library and the first virtual drive maps to a first physical drive at a second physical media library that is physically separate from the first physical media library such that media cannot be automatically passed between the first physical media library and the second physical media library; and
  forward the command to the first physical media library, wherein the forwarded command references the first physical media slot and a second physical drive at the first physical media library to redirect the command from the first physical drive to the second physical drive.

2. The controller of claim 1, wherein the computer instructions are further executable to forward the command to the first physical media library by:
 forwarding a first portion of the command to the second physical drive; and
 forwarding a second portion of the command to a physical robot at the first physical media library that references a physical element number for the first physical media slot and a physical element for the second physical drive.

3. The controller of claim 1, wherein the computer instructions are further executable to continue redirecting commands from the host from the first physical drive to the second physical drive until a tape cartridge is removed from the second physical drive.

4. The controller of claim 1, wherein the instructions are further executable to present to a plurality of hosts virtual media libraries that map to physical media slots, drives and robots at a plurality of media libraries.

5. The controller of claim 1, wherein the instructions are further executable to maintain a virtual aggregate media library mapped to physical media slots, robots and drives of the plurality of physical media libraries including the first and second physical media libraries.

6. The controller of claim 5, wherein the virtual media libraries with which hosts are associated are portions of the virtual aggregate media library.

7. A system for controlling access to media libraries, comprising computer instructions stored on a computer readable storage medium and executable by a computer processor to:
   associate hosts with virtual media libraries that map to media library components at physically separate media libraries;
   receive a command from a host at a media library controller, wherein the command references a virtual media slot representing a physical media slot at a first physical media library and a virtual drive representing a first physical drive at a second physical media library physically separate from the first physical media library such that media cannot be automatically passed from the first physical media library to the second physical media library; and
   forward the command to the first physical media library, wherein the forwarded command references the first physical media slot and a second physical drive at the first physical media library to redirect the command from the first physical drive to the second physical drive.

8. The system of claim 7, wherein the computer instructions are further executable to:
   map the command to the physical media slot at the first physical media library; and
   map the command to a physical robot at the first physical media library.

9. The system of claim 7, wherein the computer instructions are further executable to forward the command to the first physical media library by:
   forwarding a first portion of the command to the second physical drive; and
   forwarding a second portion of the command to a physical robot at the first physical media library.

10. The system of claim 7, wherein the computer instructions are further executable to continue to redirect commands from the first physical drive to the second physical drive until a tape cartridge is removed from the second physical drive.

11. The system of claim 7, wherein the first physical drive is also located at the first physical media library.

12. The system of claim 7, wherein the instructions are further executable to present to the hosts the virtual media libraries that map to physical media slots, drives and robots at a plurality of media libraries.

13. The system of claim 7, wherein the instructions are further executable to maintain a virtual aggregate media library mapped to physical media slots, robots and drives of the plurality of physical media libraries including the first and second physical media libraries.

14. The system of claim 7, wherein the virtual media libraries with which hosts are associated are portions of the virtual aggregate media library.

15. A method of controlling access to media libraries, comprising:
   associating at a media library controller hosts with virtual media libraries representing components at physically separate media libraries that cannot pass media to each other;
   receiving a command from a host at the media library controller, wherein the command references a virtual media slot representing a first physical media slot at a first physical media library and a virtual drive representing a first physical drive at a second physical media library, physically separate from the first physical media library;
   redirecting the command from the first physical drive to a second physical drive at the first physical media library; and
   forwarding the command to the first physical media library.

16. The method of claim 15, further comprising:
   associating the host with a virtual media library that represents at least a portion of the first physical media library and at least a portion of a second physical media library to which the host has access.

17. The method of claim 15, further comprising:
   mapping the command to the physical media slot at the first physical media library; and
   mapping the command to a physical robot at the first physical media library.

18. The method of claim 15, wherein forwarding the command to the first physical media library further comprises:
   forwarding a first portion of the command to the second drive; and
   forwarding a second portion of the command to a physical robot at the first physical media library.

19. The method of claim 15, further comprising continuing to redirect commands from the first physical drive to the second physical drive until a tape cartridge is removed from the second physical drive.

20. The method of claim 16, further comprising presenting to a plurality of hosts virtual media libraries that map to physical media slots, drives and robots at a plurality of media libraries.

21. The method of claim 20, further comprising maintaining at the media library controller a virtual aggregate media library mapped to the physical media slots, robots and drives of the plurality of physical media libraries including the first and second physical media libraries.

22. The method of claim 21, wherein the virtual media libraries with which hosts are associated are portions of the virtual aggregate media library.

23. A system of controlling access to media libraries comprising;
   a network;
   a host in communication with said network, the host configured to send data operation commands to a media library;
   a first physical media library;
   a second physical media library physically separate from the first media library such that the second physical media library cannot automatically pass media to the first physical media library;
   a media library controller in communication with said network and said first and second physical media libraries, said controller comprising:
   a computer processor;
   one or more communications interfaces coupled to said computer processor operable to communicate with said network and said first and second physical media libraries;
   a computer memory coupled to the computer processor, the computer memory storing a set of computer instructions executable by the computer processor to:
   associate the host with a virtual media library that represents at least a portion of the first physical media library and a portion of the second physical media library to which the host has access;

receive a command from the host, wherein the command references a virtual media slot representing a physical media slot at the first physical media library and a virtual drive representing a physical drive at the second physical media library;

redirect the command from the physical drive at the second physical media library to a physical drive at the first physical media library; and forward the command to the first physical media library.

24. The system of claim 23, wherein the computer instructions are further executable to:

map the command to the physical drive at the first media library;

map the command to the physical media slot at the first media library; and map the command to a robot at the first physical media library.

* * * * *